(No Model.)

E. H. GARCIN.
PACKING DISK FOR HYDRAULIC PRESSES.

No. 407,478. Patented July 23, 1889.

WITNESSES
Walter H. Pumphrey.
H. E. Johnson.

INVENTOR
Ed. H. Garcin
By J. C. Higdon
His Attorney.

UNITED STATES PATENT OFFICE.

EDWARD H. GARCIN, OF RICHMOND, VIRGINIA.

PACKING-DISK FOR HYDRAULIC PRESSES.

SPECIFICATION forming part of Letters Patent No. 407,478, dated July 23, 1889.

Application filed May 3, 1889. Serial No. 309,493. (No model.)

*To all whom it may concern:*

Be it known that I, EDWARD H. GARCIN, of Richmond, Henrico county, Virginia, have invented certain new and useful Improvements in Packing-Disks for Hydraulic Presses, of which the following is a full, clear, and exact description, reference being had to the accompanying drawings, forming a part hereof.

This invention relates to certain improvements in piston-packing especially designed for hydraulic rams, having for its object more particularly to produce a perfect water-tight joint, while it combines therewith durability and lubricating qualities; and to these ends the nature of my invention consists of the detailed construction of the packing, as will appear from the following description and accompanying illustrations, in which—

Figure 1:
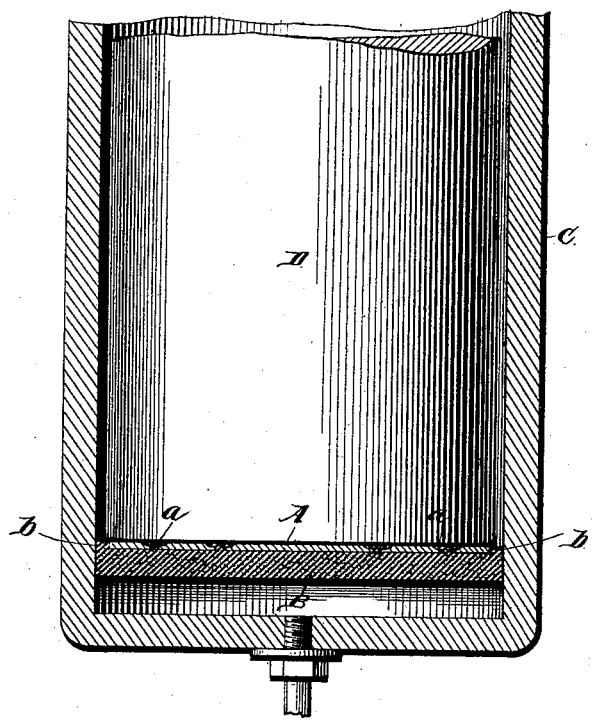
Figure 2:
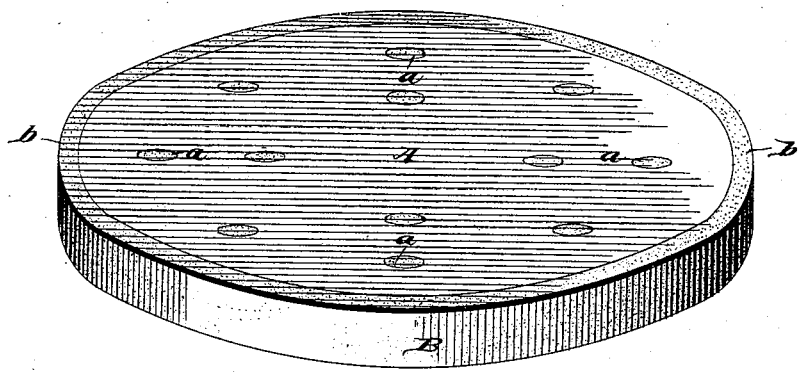
Figure 3:
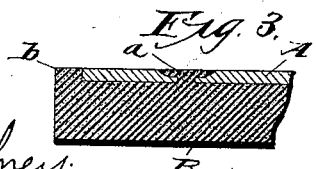

Figure 1 is a broken-away sectional elevation of a hydraulic ram or press cylinder and its piston embodying my improved packing or piston. Fig. 2 is an enlarged perspective view of my packing or piston, and Fig. 3 is a broken-away sectional view thereof.

In the embodiment of my invention I make the piston of two general parts—the preferably steel disk A and the vulcanized-rubber portion or packing B. The packing or rubber portion is molded upon the steel disk or plate so that the upper surface of the disk will be flush with the upper surface of an annulus or ring-like extension $b$ of the rubber or packing; but the entire lower surface will be wholly rubber; also, in the plate or disk of steel A are apertures $a$, arranged, it may be, near the margin, and having, preferably, the contour shown, the bottom being contracted, and the upper remaining portions being flared or extended laterally and upward, thus causing the vulcanized rubber during the molding of the piston or packing to spread at these points as it hardens to serve as an additional means of fastening. The rubber portion, as will have been observed, forms a marginal portion or packing proper $b$ to produce a perfect water-tight-fitting joint between the same and the walls of the cylinder.

In order to possess the piston of lubricating qualities, to allow it to readily return after the effective stroke to its first position, the rubber portion of the piston is combined in the process of vulcanization with plumbago. The steel plate strengthens the piston as well as furnishes it with a suitable wearing-surface where it has contact with the iron ram.

C is the ram or piston-cylinder, and D the ram, both of ordinary construction.

I am aware that, broadly, a vulcanized-rubber piston or packing is not new, and that such a packing or piston made in annular form is not new; but I am not aware that a vulcanized-rubber piston or packing provided with an upper steel wearing surface or disk upon which the rubber portion is molded, so as to form an unbroken under surface of rubber, has ever been produced, as and for the purposes hereinbefore set forth by me.

Having thus described my invention, what I claim as new, and desire to secure by Letters Patent, is—

1. The piston consisting of the circular vulcanized-rubber part or member having the lower continuous rubber surface and an upper annulus or ring-like surface and the steel wearing plate or disk having its upper surface flush with the upper surface of the said annulus or ring-like rubber portion, substantially as specified.

2. The herein-described piston, consisting of a steel plate provided with a series of upwardly-flared apertures, said plate forming the upper surface of the piston, and a body of rubber which forms the under surface molded upon said metallic disk with portions thereof located in such flared apertures, substantially as described.

3. The herein-described piston, consisting of the central steel disk or plate having a series of flared apertures and the main body having portions located in said flared apertures, and a marginal portion surrounding said disk or plate and made of combined vulcanized rubber and plumbago, substantially as specified.

In testimony whereof I affix my signature in presence of two witnesses.

EDWARD H. GARCIN.

Witnesses:
JOHN S. HARWOOD,
WM. F. HARWOOD.